July 23, 1968   C. J. WELCKER ET AL   3,393,424
SHRIMP PROCESSING MACHINE
Filed July 26, 1967   2 Sheets-Sheet 2
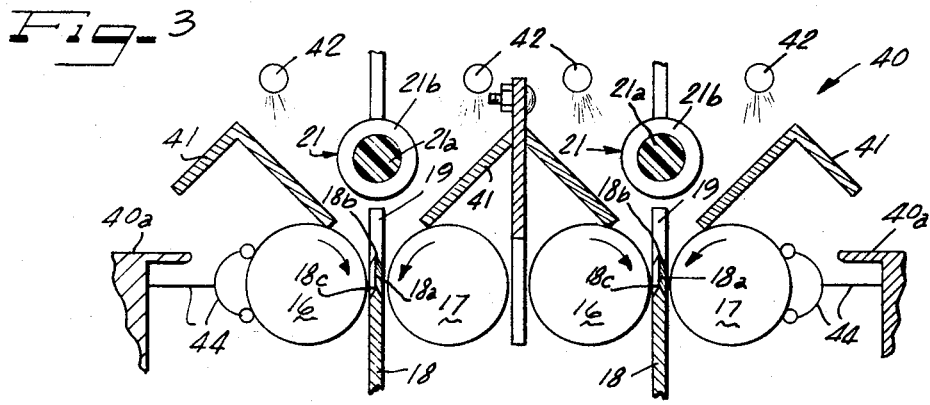
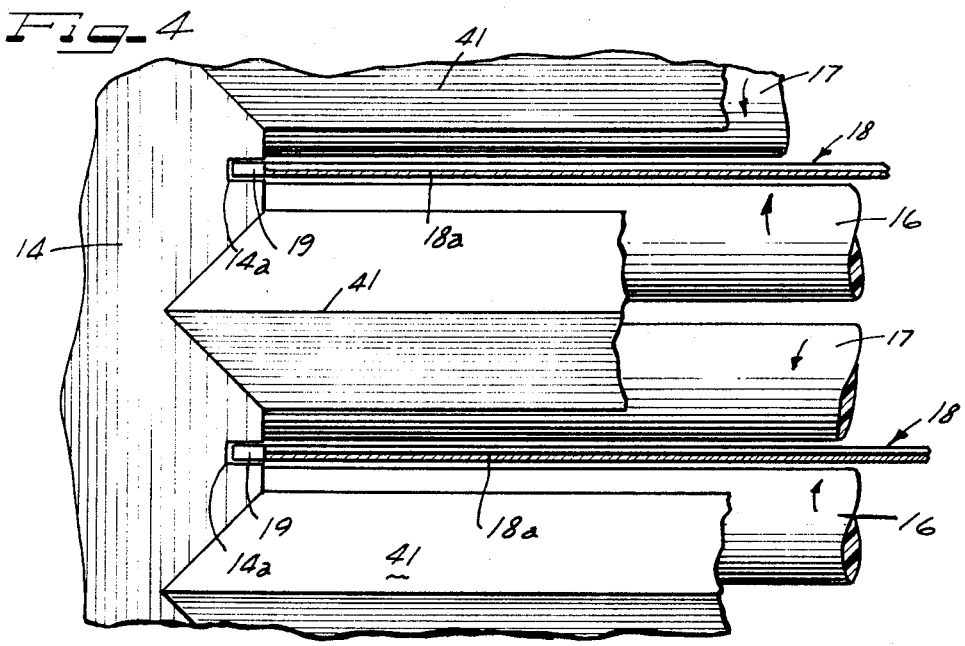
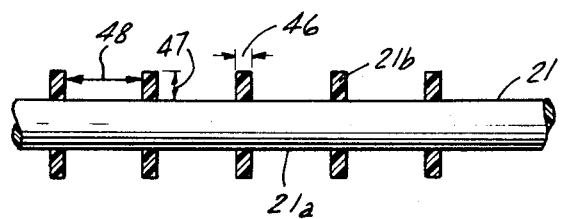
INVENTORS
CLYDE J. WELCKER
ROLAND L. WELCKER
BY *Hill, Sherman, Meroni, Gross & Simpson*   ATTORNEYS United States Patent Office 3,393,424
Patented July 23, 1968

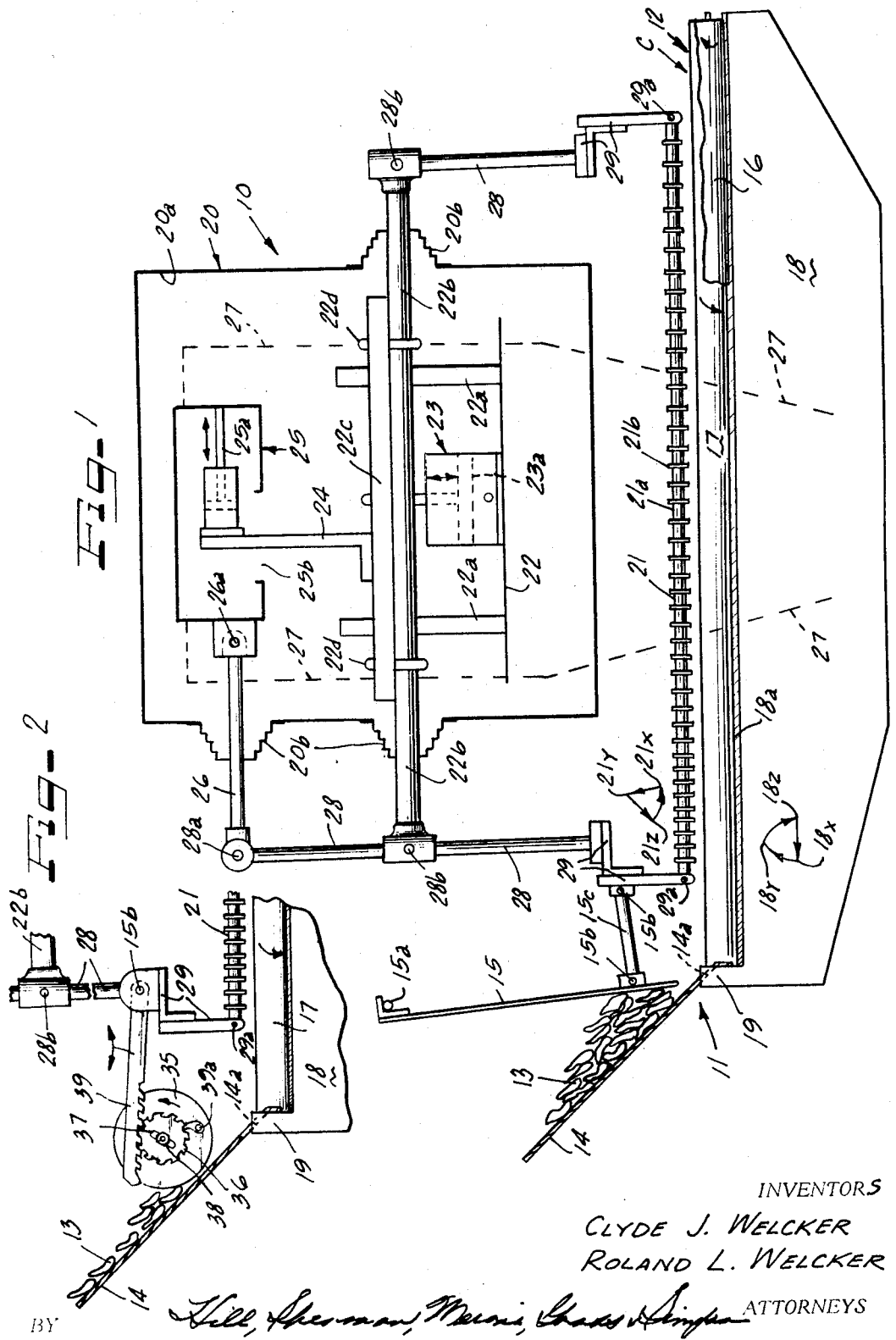

3,393,424
SHRIMP PROCESSING MACHINE
Clyde J. Welcker and Roland Welcker, both of 1334–36
St. Bernard Ave., New Orleans, La. 70116
Continuation-in-part of application Ser. No. 536,690,
Mar. 23, 1966. This application July 26, 1967, Ser.
No. 656,079
15 Claims. (Cl. 17—2)

ABSTRACT OF THE DISCLOSURE

A shrimp and like marine life cleansing method and machine utilizing at least a pair of horizontal rollers spaced apart a distance to accommodate a sharp-edged center plate, the sides of which define a processing channel with each of the individual rollers and a segmented impeller member in register with the center plate and spaced thereabove. The center plate is driven through a vertically undulating cycle with the segmented impeller member being simultaneously driven in an opposing vertically undulating cycle so that raw shrimp and the like are peeled, de-headed, de-veined and otherwise cleansed by the co-action of the rollers, the center plate and the segmented impeller member to yield fully cleansed and substantially unmutilated meats. The machine also has a pulsating gate at the receiving chute which, in cooperation with a feed appendage attached to one end of the center plate, automatically controls the feed of shrimp and the like to the peeling area.

---

This is a continuation-in-part application of our co-pending applications U.S. Serial Nos. 536,690, filed Mar. 23, 1966, and 597,737, filed Nov. 29, 1966.

In our Patents Nos. 3,080,605, 3,143,761, 3,143,763 and our aforesaid co-pending applications Ser. Nos. 536,690 and 597,737, all of which are incorporated herein by reference, we have generally disclosed and claimed a shrimp processing machine and method which generally includes a pair of horizontal parallel side members having inclined or sloping surfaces extending downwardly toward each other. The inclined surfaces, which may be planar plates or rollers, are spaced apart to define a channel therebetween. Mounted in the channel between the generally parallel side members is a vertical plate having flat side surfaces facing each of the parallel members, which vertical plate is driven through a vertically undulating cycle. The flat side surfaces of the vertical plate also define channels with each of the parallel members. The shrimp are engaged at the channels by the various surfaces and the inedible or objectionable portions thereof are removed. In one embodiment of such a machine, a feeder appendage is attached to the receiving end of the center plate to aid in removing the shrimp from the receiver chute to the peeling channels. In another embodiment a top impeller member is provided, spaced above the center plate and in register therewith, which is driven through a vertical cycle substantially opposing the cycle of the vertical plate to further massage, peel, etc., the shrimp and aid in moving them down the peeling channels.

The present invention contemplates improvements in this type of processing machine whereby the shrimp and like marine life are controllably fed into peeling channels and are peeled, squeezed, massaged and otherwise processed to remove inedible matter, including veins, to produce fully cleansed, substantially unmutilated edible meats.

Accordingly, it is an object of the present invention to provide an improved shrimp and like marine life cleaning machine which is capable of performing in one single operational process, the necessary cleansing operations at high rates of speed to produce fully cleansed meats ready for packaging or the like.

A further object of the present invention is to provide an improved shrimp cleaning machine having simplified movements for ease of operation, allowing the shrimp to be automatically divested of its outer covering, and other inedible and/or objectionable matter, such as entrails, sand, grit, veins, appendages, etc., which are automatically pinched, squeezed, massaged and otherwise removed from the shrimp to yield fully cleansed ready to eat foodstuff.

A still further object of the present invention is to provide a machine capable of processing marine life such as shrimp, to yield fully cleansed, ready to eat foodstuff by frictional pinching, squeezing, massaging and controlled slitting action accompanied by the cleansing and transporting of the marine life through the processing channel, and which machine is relatively simple and inexpensive to manufacture, operate and maintain.

A still further object of the present invention is to provide a single machine capable of performing all of the cleansing operations, including removal of the shell, outer appendages, sand, grit, entrails and veins in one operation, while avoiding meat mutilation and discoloration and which machine is relatively compact and relatively lightweight.

Yet a further object of the invention is to provide a shrimp and marine life cleansing machine having peeling channels for the shrimp and means above the peeling channels preventing any shrimp from passing through the peeling channels without submitting to the cleansing operation, while providing additional work surfaces to contact the shrimp and aid in the cleansing thereof.

Still a further object of the invention is to provide a novel feed means regulating the shrimp feed into the separate peeling channels of the shrimp cleaning machine.

A feature of the machine of the present invention is the utilization of the inherent physical characteristics of the shrimp and like marine bodies and their outer coverings to the advantage of the cleaning process in order to effect a speedy, complete and uniform removal of the inedible and objectionable portions of the marine life.

It has been noted in the process of and cleaning shrimp and like marine life, the fingers manually utilize pinching, pulling, unraveling, massaging, kneading, etc. operations. In the instant invention these and other desirable manual operations are utilized and substantially duplicated with the exploitation of frictional forces. These frictional forces and their reactions are utilized in de-heading, peeling, removing exterior appendages, squeezing out entrails, massaging out major veins, sand, grit and generally finish-processing the shrimp and like marine life to present fully cleansed, unmutilated meats.

It is to be noted that the shrimp and like marine life generally have heterogeneous structures, including a body, a neck, a mid-section, an end section and an outer covering which is substantially different from the meat portions, and also have appendages, feelers, pinchers, legs, veins, entrails and the like. The various appendages normally attached to the body in one way or another possess certain elastomeric properties for flexibility but lack high synergistic response resiliency and/or are not securely attached to the body. Their cross-sections are small as compared with other parts of the marine life underconsideration and all of these factors are taken advantage of by being easily engaged and removed by the cooperating components of the processing machine. The outer covering, such as the shell, is generally composed of "rigid" material, which is stiff in comparison to the other parts and possesses limited elastomeric properties of flexibility, with some synergistic response. The degree of resiliency is relatively slight and the elastic modulus is quite low so that it does not take too much force to overcome this resiliency. The outer covering, such as the shell, is also generally attached to the body by relatively flimsy tissue which is easily ruptured. The outer covering or shell also has a degree of roughness, nicks, barbs, sharp edges and the like, all of which increase the natural coefficiency of friction of the outer shell. The head shell is only slightly resilient due to its shape and composition so that the application of force easily flattens it. The inner soft mushy components add little or nothing to the resiliency of the shell structure and once flattened, they remain squashed. The body meat is substantially different from the preceding components of the marine life in that it has inner elastomeric properties and in addition to flexibility, has inherent synergistic response to deformation and a high elastic modulus, making it more elastic. The surface of the body meat is smooth, moist and relatively resilient and the addition of water tends to reduce the coefficient of friction of the body meat with the operative machine surfaces and increases the natural differences and values of the coefficient of friction of the smooth body meats with the outer coverings. In the application of frictional forces in the processing of shrimp, the stresses produce strains, including tension on neck gristles to cause separation, shear at the inner face of the outer coverings and body meats to cause loosening, shear in sliding the loosened outer cover from the body meats, compression of the head to cause squashing and removal, pinching and pulling of the various appendages, including the feelers, legs, tail flippers and so forth, massaging and controllably slitting the body meats to remove grit, sand, veins and other objectionable inner matter without mutilating the meats, and compressing of the outer covering and the various appendages to force them into a space which does not accommodate the body meats.

Other objects, advantages and features of the invention will become more apparent with the teachings of the present invention in connection with the disclosure of the preferred embodiments thereof in the specification, claims and drawings.

Brief description of the drawings

FIGURE 1 is an elevational diagrammatical view, with parts broken away and the cover removed for the sake of clarity, illustrating the relationship between the various components of the processing machine;

FIGURE 2 is a partial elevational diagrammatical view illustrating a modified embodiment of a portion of the processing machine;

FIGURE 3 is an end elevational view of the processing machine illustrating the various components thereof in somewhat schematic form;

FIGURE 4 is a partial top perspective view with parts omitted for clarity, illustrating the processing channel and related parts of the processing machine; and FIGURE 5 is a detailed perspective view of a preferred embodiment of the segmented impeller member used in the processing machine of the present invention.

Description of the preferred embodiments

As shown in FIGURE 1, a shrimp and like marine life processing machine, hereinafter referred to as a processing machine, generally indicated at 10, has a receiving end 11 and a discharge end 12. The receiving end 11 of the processing machine 10 is provided with a downwardly sloping receiving chute 14 which is provided with a plurality of uniformly spaced individual slots 14a, for purposes which will be explained hereinafter. The receiving chute 14 receives raw shrimp 13 or the like from a suitable source (not shown) and directs the shrimp and the like, downwardly to a processing channel wherein the shrimp are fully cleansed to yield edible and unmutilated meats.

In working relationship with the receiving chute 14 there is provided a pulsating gate member 15, one form of which is shown at FIGURE 1. The form of pulsating gate 15, as shown in FIGURE 1, generally comprises a rectangularly-planar body having an upper portion remote from the receiving chute 14 and pivoted about a point 15a. The lower end of this form of pulsating gate is in close working relationship with the surface of the receiving chute 14 and, as shown in FIGURE 1, is pivotally connected as at 15b, by means of rod 15c, to an appropriate drive means to arcuately move the lower portion of the gate along a path as shown by the double-headed arrow, whereby shrimp are controllably allowed to pass from the receiving chute to the processing channel. Thus, the pulsating gate 15 not only controllably feeds the raw shrimp to the processing channels but also serves as a reservoir or bin for the raw shrimp to insure a continuous supply thereof to the processing channels.

The processing channel may be generally defined as having at least a pair of forwardly and downwardly sloping surfaces spaced apart a predetermined distance so as to define a processing channel therebetween. Preferably, such surfaces take the form of processing rollers 16 and 17 which are mounted for rotation by generally conventional means and are provided with a suitable power supply means (not shown), rotating the rollers 16 and 17 relative to one another, preferably toward each other, as indicated by the curved arrows. The processing rollers 16 and 17 are spaced apart a predetermined distance, generally sufficient to define a relatively narrow space preferably in the range of 0.094 to 0.50 inch, so as to form a channel C therebetween. A set of processing rollers generally consists of two generally parallel horizontal rollers forming a continuous channel extending from a receiving end to a discharge end of the processing machine. The processing rollers 16 and 17 terminate at the discharge end 12 of the machine 10 so that the cleansed shrimp and the like, fall as by gravity, from the continuous channel down between the shafts or ends of the rollers to a suitable receiving means (not shown). A number of sets of processing rollers substantially identical to rollers 16 and 17 may be provided, depending primarily on the volume of shrimp to be processed. As shown in FIGURE 1, there is provided at least one set of processing rollers 16 and 17, however, this is a partial and oversimplified view, shown for clarity, and it has generally been found that a machine with about eleven sets of processing rollers provides sufficient capacity for most standard shrimp processing and cleansing operations.

The processing rollers of the instant invention are preferably provided with an elastomeric frictional outer covering, which is preferably composed of a polyvinyl chloride or PVC, as it is commonly referred to. This outer covering may be rigid or somewhat flexible, and is preferably somewhat flexible, having localized yieldable surfaces. Of course, it will be understood that other suitable non-toxic, waterproof, resilient materials may be used to form the elastomeric outer frictional surface of the processing rollers. The PVC-type rollers are preferred as they are very durable, easily processed, low in cost, have excellent water and chemical resistance and are relatively non-toxic. Further, PVC resins are usually compounded with a wide range of plastisols to obtain any desired degree of flexibility, strength and frictional properties.

The elastomeric outer surfaces of the processing roller thus provided have exceptional frictional properties which are utilized in the cleansing and processing of the shrimp and like marine life. Further, the plasticized elastomeric material provides a substantially waterproof, non-toxic surface which is highly desirable in the handling of edible marine life. The relatively soft, flexible and resilient outer surface provided by the elastomeric materials covering the processing rollers, cleans and processes all sizes of shrimp and like marine life, including the very small shrimp in the range of 125 to 150 count and the relatively larger shrimp up to and including shrimp as large as 15 count. A shrimp count may be defined as the number of particular sized shrimp that go into making up one pound. The flexible, soft outer surfaces of the processing rollers have a relatively high coefficient of friction and localized yieldability, admit the shrimp and like marine life into more intimate contact with the various processing surfaces of the machine. The cleansed shrimp and like marine meats are forced upwardly as slippage occurs, when the outer covering of the marine life is removed; this slippage is preferably augmented by the addition of water, which acts as a lubricant. Of course, in addition to lubricating the various processing surfaces of the machine, water also cleans the machine and washes the trash downwardly to a suitable trash disposal means (not shown). The localized yieldable surface of the processing rollers allows the relatively hard heads and skins of the marine life to be drawn down to the trash level. Sardines and other like small fish that are generally included in shrimp catches, may also be simultaneously cleaned with the shrimp. The fish are generally skinned and their entrails and the like are squeezed out, thereby, leaving the fish ready for cooking or other desirable processing.

Each processing roller may also be provided with a surface pattern on its outer peripheral surfaces to increase the frictional properties of such peripheral surfaces. Various patterns such as shown in the aforesaid pending applications are useful in providing this additional friction, and in the preferred embodiments, relatively fine helically spiralled grooves and ridges are provided over the entire length of the processing roll and superimposed thereon is another set of helical grooves and ridges which are relatively more distinct than the first set of grooves and ridges and are in relatively coarser spiral configuration. This unique configuration tends to act as a conveying mechanism for the shrimp and like marine life in the processing channels formed by two such opposing spiral surfaced rolls, and in addition, the grooves and ridges provide additional areas of contact with the marine life to further aid in the processing thereof, as will be explained hereinafter.

Each set of rollers is separated from the adjoining set of rollers by an appropriate sloping shield or guide member, as best seen in FIGURES 3 and 4, for directing the shrimp and like marine life into the channel between a set of processing rollers. These guide members may be integrated with, and suitably fastened to the receiving chute to provide a generally continuous surface therewith. As best seen in FIGURES 3 and 4, each of the guide members has a general shape of an inverted V with one side of the guide member feeding marine life into the channel between one set of processing rollers and the other side of the guide member feeding into the channel between an adjacent set of processing rollers.

The vertically movable and upwardly extending member or center plate 18 extends upwardly between the processing rollers 16 and 17 so as to present its planar side surfaces in working relationship to the downwardly sloping surfaces of the respective rollers. The center plate 18 is geneally positioned in the substantial center of the channel C formed between the rollers 16 and 17 and is at least coextensive with the rollers. Center plate 18 has a top working edge 18a and a feed appendage 19, both of which aid in the processing of shrimp and like marine life, as will be explained hereinafter. Of course, one center plate such as 18 is provided for each individual set of processing rollers.

Spaced in working relationship above the center plate 18 there is provided a segmented impeller member 21. Generally, the segmented impeller member 21 extends about 50% to about 100% of the length of the processing rollers, and in the preferred embodiment, the segmented impeller member 21 is generally 75% of the length of the processing rollers. Preferably, the segmented impeller member 21 is spaced inwardly from the receiving end of the processing rollers about 10% to 20% of the overall length of the processing rollers and may, in addition, be somewhat spaced from the discharge end of the processing rollers. The spacing of the segmented impeller member in respect to the receiving end 11 of the processing rollers facilitates the orderly movement of the shrimp into the channel C to allow the initial cleansing operation to begin prior to contact with the segmented impeller 21. The spacing of the segmented impeller member 21 from the discharge end 12 of the processing rollers, allows the fully cleansed shrimp and other like marine life to be discharged to a suitable receiver (not shown) and to be visually inspected thereat to insure that sufficient cleansing takes place. The segmented impeller member 21 is provided with a plurality of substantially uniformly spaced rectangular grooves 21a and ridges 21b. The segmented impeller member 21 is preferably formed in the shape of a cylindrical rod which has an inner portion composed of a relatively hard material, such as stainless steel, which is then covered with an elastomeric material, such as the hereinbefore referred to PVC resin material which has been somewhat plasticized to allow a greater degree of flexibility or yieldability to the main body portion of the segmented impeller. The ridges 22b may be formed on the segmented impeller member as by cutting grooves into a relatively thick coating of the PVC resin to the desired configuration, or they may be formed by manufacturing a relatively smooth surfaced elongated cylindrical rod and then taking a second hollow rod composed of similar material, but having an inner diameter of sufficient size to accommodate the previously formed smooth rod, and cutting the second PVC rod into ring-like member and slipping them at spaced intervals over the first form rod and thereby forming the desired grooves and ridges. Such ring member may then be appropriately fastened, as by glue, onto the first smooth rod member. The grooves and ridges provide additional working edges contacting the shrimp for more efficient cleansing in co-operation with the other working surfaces of the processing machine and in addition, these edges provide an improved horizontal thrust to the shrimp for impelling them through the processing channels toward the discharge end of the machine, as will be explained in more detail hereinafter. In addition, the grooves and ridges provide a discontinuous solid surface which is composed of a frictional, non-toxic solid elastomeric material that is more efficient in moving the shrimp horizontally and co-acting its entire length with the other working surfaces, such as the processing rollers and the vertically moving center plate, to yield fully cleansed and substantially unmutilated meats.

The center plate 18 and the segmented impeller member 21 are suitably driven, as by independent drive means, or a single drive means so that the center plate moves in a unique vertically undulating inverted D-shaped cycle, as indicated by the triple-headed arrows 18x through 18z, while substantially simultaneously the segmented impeller member 21 is driven through a substantially opposing vertically undulating cycle, as indicated by the triple-headed arrow lines 21x through 21z. Preferably, a single drive means 20 is utilized, such as shown, having a housing member 20a and flexible waterproof boot members 20b, protecting the inner chamber of drive means housing 20a from ambient conditions. Within the housing 20a there is provided a suitable rigid support 22 which is suitably anchored to the ground or to any other desired object, such as a ship deck. Vertical guide legs 22a are suitably attached, as by welding or bolting, to the ground support 22 so as to extend upwardly therefrom. At a distance above the ground support 22 there is provided a vertically moving arm 22b which has a support member 22c fastened thereabove by appropriate means, such as U-clamps 22d. The vertically moving arm 22b and the horizontal support member 22c are carried on the vertically extending legs 22a by suitable bearing means, not shown, to allow limited vertical movement of the vertically moving arm 22b and attached support member 22c along the axis of the vertical legs 22a. A vertical power cylinder housing 23 is suitably attached to the ground support 22 and has a piston member 23a extending thereabove and suitably rigidly fastened to the vertically moving arm 22b. The vertical power cylinder 23 is supplied with pressurized fluid from a suitable supply (not shown) to move the cylinder in an up and down position, such as shown by the double-headed arrow, and thereby move the vertically moving arm in a similar up and down position. Rigidly attached to the horizontal support member 22c is a vertical support member 24 which has its upper end encompassed with a horizontal power cylinder housing 25, which is provided with a suitable slot 25b to accommodate vertical support member 24 and allow limited horizontal movement of the housing 25 without impedance from the vertical support member 24.

Suitably attached to the vertical support member 24 at its upper end, a horizontal power cylinder 25a is provided within the horizontal air cylinder housing 25. The piston is suitably fastened to the horizontal power cylinder housing 25 so that when the piston moves in a horizontal direction, as indicated by the double-headed arrow thereon, the entire housing moves with it. As explained hereinbefore, horizontal support member 22c is mounted on suitable bearings allowing it to move with the vertically moving arm 22b. Of course, bearing means are provided between vertically moving arm 22b and vertical legs 22d so that when both the vertical power cylinder 23a and the horizontal cylinder 25a are activated, the vertically moving arm 22b and the horizontal support member 22c and vertical support member 24 move up and down while substantially simultaneously the horizontal power cylinder 25a and various attached components all move in a back and forth horizontal direction as well as in the up and down direction. Extending from one end of the horizontal power cylinder housing 25 there is provided a horizontally moving arm 26 having a pivot point 26a between the housing 25 and the horizontally moving arm 26 to accommodate the limited vertical movement.

Suitable gang couplings, generally indicated diagrammatically at 27, interconnect the horizontal power cylinder housing 25 with the center plate 18, thereby imparting the desired movement to the center plate. Any suitable rigid connection means may be utilized to interconnect the horizontally moving housing 25 with the vertical center plate 18. Thus, it will be seen that the combined force components of the vertical moving cylinder and the horizontal moving cylinder imparts to the center plate the unique vertically undulating cycle, shown by the triple-headed arrows 18x through 18z.

The outer end of horizontally moving arm 26 is connected to interconnecting arm 28 by means of a first pivot means 28a. The interconnecting arm 28 is appropriately connected to the vertically moving arm 22b by pivot means 28b. Thus, it will be seen that when the vertically moving 22 moves in an up and down direction in response to the vertical power cylinder 23a, the entire horizontal power cylinder housing 25 and attached horizontally moving arm 26 also move in an up and down direction, however, when the horizontal power cylinder 25a is activated, interconnecting arm 28 pivots at point 28b in response to the movement of the horizontal power cylinder 25a, so that its extreme end points move in opposing horizontal directions and it will be noted that the vertical arm 22b does not move in a horizontal direction.

At the lower end of interconnecting arm 28 there is provided suitable connection means 29 interconnecting connecting arm 28 to the segmented impeller member 21 through an appropriae pivot 29a. In addition, as shown, connecting means 29 may also be suitably attached by means of pivots 15b, which are interconnected by rod 15c to the pulsating gate 15 to impart limited horizontal movement thereto. As will be appreciated rod 15c may be elongated so as to contact interconnecting arm 28 at a higher point than presently shown to increase the pulsating movement of the gate 15. Further, independent drive means may be provided for the pulsating gate 15 and phased to act in timed sequence with the operation of the processing machine. Thus, the drive means 20, by the simultaneous activation of the vertical power cylinder 23a and the horizontal power cylinder 25a, drives the center plate memebr 18 through a vertically undulating cycle while substantially simultaneously driving the segmented impeller member in an opposing vertically undulating cycle so as to impart a forward thrust to the shrimp in the working channel while at the same time driving the pulsating gate in unison therewith to controllably feed raw shrimp to the processing channels.

Turning now to a somewhat more detailed discussion of the operation of the shrimp processing machine 10, as shown in FIGURE 1, it will be noted that vertically moving arm 22b, horizontal support member 22c and vertical support member 24 all move in a vertical direction in response to movement of the vertical power cylinder 23a, while horizontal power cylinder housing 25, horizontally moving arm 26 and all attached components thereto in addition to moving up and down in response to the movement of the vertical cylinder 23a, also move in a horizontal direction in response to the horizontal cylinder 25a. The substantially simultaneous horizontal and vertical motion thus obtained communicates a unique undulating cycle motion to the center plate 18, as diagrammatically indicated by the triangularly-shaped arrow line 18x through 18z. The same combination of horizontal and vertical motions give a similar but substantially opposed undulating cycle to the segmented impeller member 21, as diagrammatically indicated by an opposing triangularly-shaped arrow line 21x through 21z. The separate horizontal and vertical motions are phased and programmed to give the resulting respective undulating motions to the center plate 18 and the segmented impeller member 21.

Thus, when the center plate 18 begins to move upwardly and forwardly in the direction of the discharge end 12 of the processing machine, as along the path 18x to 18y, in response to the substantially simultaneous upward movement of vertically moving arm 22b and the forward movement of horizontal moving arm 26, the segmented impeller member 21 substantially simultaneously moves upwardly and backwardly toward the direction of the receiving end 11, as diagrammatically indicated along the path 21x to 21y. It will be noted that when the top portion of interconnecting arm 28 is moved in one direction, the bottom portion thereof moves in an opposing direction as the arm 28 pivots about point 28b. The center plate member 18 reaches its maximum vertical position, as at point 18y and begins to move downwardly and forwardly in response to the substantially simultaneously downward movement of the vertically moving arm 22b and the continued forward movement of the horizontal arm 26 (in this regard it will be noted that horizontal power cylinder 25a has substantially greater strokes than does the vertical power cylinder 23a), substantially simultaneously the segmented impeller member 21 reaches its maximum vertical position, as indicated by point 21y and begins to move downwardly and backwardly along a path from point 21y to point 21z in the direction of the receiving end 11 of the machine 10. Finally, when the center plate 18 has reached its minimum vertical position, as indicated by point 18z and begins its return trip in a horizontal plane towards its initial position, in response to the backward motion of the horizontal arm 26, while vertical arm 22b is still at its lower position, the segmented impeller member 21 reaches its intermediate vertical position, as at point 21z and begins to make an arc-like motion toward its initial position, such as to substantially converge toward the horizontal path of the center plate member 18 so that this horizontal path assumes a substantially tangential relationship to the arc-like motion of the segmented impeller member. It will be noted that when the segmented impeller member 21 is at its intermediate vertical position, it is also at its maximum horizontal backward position, thereby being in a relatively greater vertical position than the center plate is at the corresponding portion of its cycle. This relationship of these two members results in a horizontal forward thrust of the segmented impeller member which is greater than the backward thrust movement of the center plate 18, so that the shrimp within the processing channel are pushed toward the discharge end of the processing machine.

As will be appreciated, the distance between point 28a and point 28b may be adjusted to vary the particular relationship between the cycles which the center plate member 18 and segmented impeller member 21 undergo to vary to amount of work done on the shrimp. Thus, if a greater distance is provided between points 28a and 28b than between point 28b and the connecting means 29, a lesser horizontal returning arc-like motion will result for the segmented impeller 21. Further, pivot point 29a may also be raised or lowered for variation in clearance between the top working edge 18a of the center plate 18 and the working face of the segmented impeller member 18 for varied working conditions. In one embodiment of the processing machine, a clearance in the range of 0.5 to 1.0 inch yields satisfactory results. In a preferred embodiment, the segmented impeller 21 moves a horizontally forward distance, as along path 21z to 21x which is 50% to 80% greater than the horizontally backward distance the center plate 18 moves, as along path 18z to 18x. The segmented impeller 21 can thus impart forward thrust to the shrimp in the processing channel, and in addition jostle, move or otherwise cause all of the shrimp in the channel to come into contact with the working elements of the processing machine.

Referring now to a more detailed discussion of the center plate member 18, it will be noted that it is substantially a rectangularly-shaped planar member having side portions thereof facing each of the processing rollers so as to form working channel with each individual peripheral surface of the processing rollers and having a feed appendage 19 attached to its receiving end. Various non-toxic and non-corrosive materials may be used for the center plate 18, however, a preferred embodiment has the center plate and the appendage made of aluminum. Nevertheless, it will be appreciated that certain rigid plastics having the requisite characteristics may also be used. The center plate member 18 is generally linearly coextensive with the processing rollers 16 and 17 and has a height sufficient to allow its top working portion or edge 18a to be generally equal to, or slightly above the plane containing the centers of the processing rollers at the beginning of their unique undulating cycle, thereby forming a continuous channel for the shrimp and like marine life to pass through. Center plate 18 has a high point 18b (as best seen in FIGURE 3) at the receiving end 11 of the processing machine, which slowly slopes downwardly to a low point 18c (as best seen in FIGURE 3) at the discharge end 12 of the processing machine. The center plate is of a width which is such as to be in relatively close-running relationship with the downwardly converging surfaces of the processing rollers, which define the working channels. In a preferred embodiment, the center plate 18 has a width in the range of 0.0625 to 0.250 inch and is preferably 0.125 inch wide.

Center plate 18 has a feed appendage 19 extending above and beyond the linear surface boundaries of the center plate. The width of the appendage 19 must be at least equal to the maximum horizontal stroke of the undulating cycle. In this regard, greater efficiency is obtained by having a channel closure at all times at the receiving end of the processing rollers. This prevents any shrimp and like marine life from sliding off, or being lost, or damaged by the ends of the rollers and allows the feed appendage to contact and propel the shrimp down the processing chute. In this regard, it will be noted that when the center plate member 18 moves through its undulating cycle, the feed appendage moves through a similar cycle so that it can contact shrimp and like marine life at the lower end of the receiving chute 14 and propel them in a direction toward a discharge end of the machine. Thus, the feed appendage 19 extends upwardly a distance which is at least sufficient to effect a closure at the receiving end of the processing rollers in cooperation with the receiving chute, which distance is somewhat above the top point 18b of the working edge 18a of the center plate 18. In the preferred embodiment of the invention, appendage 19 has a width in the range of 0.5 to 3.0 inches and extends beyond the ends of the processing rollers, and a height above the high point of the center plate 18 in the range of 1.5 to 4.0 inches; preferably the width of the appendage 19 is 1.5 inches and the height is 3.0 inches.

The center plate member 18 is also provided with a top working edge 18a, as explained hereinbefore, which is tapered to form a knife-like dege along the top portion thereof for controllably slitting the shrimp and like marine life during contact with said edge. The term "controlled slitting" as used in this disclosure preferably indicates generally that a slight shear force is applied to the shrimp and like marine life bodies to effect some cutting thereof, but which shear force is generally insufficient to cause material separation or parting of the normally solid or "hard" body meat. This slight shear force is sufficient to cause separation of the body tissues surrounding veins and the like, thereby exposing the same to the pinching and squeezing action of the machine components. In other words, the controlled slitting force applied to the shrimp and like marine life is not transmitted throughout the shrimp bodies, but only acts on the outer surface portions thereof. As will be appreciated, shrimp and like marine life do not have extensive vein systems and generally have a "main vein" in the approximate center of the body meats close to the top surface thereof so that they are readily exposed for removal without undue mutilation of the meats. The controlled slitting action of the top working edge 18a in cooperation with the other operative components including the segmented impeller member merely exposes these veins so that they may be more readily removed by the other various cooperating machine components, but which action does not actually cut entirely through the shrimp or unduly mutilate the body meats.

Referring momentarily back to the unique undulating cycle of the center plate 18 and the segmented impeller member 21, it will be noted that these are unique oscillating vertical cycles which are undulating in nature and are defined generally by a triangular-shape or a "D" tilted about 90°. Thus, assuming that point 18x to be the starting point of the center plate cycle and point 21x to be the starting point for the segmented impeller cycle, so that when the center plate 18 moves upwardly and forwardly in an arcuate path to point 18y, the segmented impeller member 21 simultaneously moves upwardly and backwardly in an arcuate path to point 21y. The center plate 18 is next continuously moved downwardly and forwardly in an arcuate path from point 21y to point 21z, while substantially simultaneously the top impeller member 21 is continuously moved downwardly and backwardly from point 21y to point 21z. The center plate 18 is then moved in a substantially horizontal path from point 18z to the starting point 18x, while substantially simultaneously the segmented impeller member 21 is moved in an arcuate path from point 21z to the starting point 21x. In other words, the center plate and segmented impeller member are moved in an undulating but opposing motion in a vertical plane and between each of the undulations, are moved generally horizontally back to their respective starting points. The undulating path of travel for these members tends to transport and massage the shrimp and marine life along the processing channels toward the discharge end of the machine, thereby allowing full cooperation between the downward sloping surfaces of the processing rollers, the planar side surfaces of the center plate, the working edge of the center plate and the working face of the segmented impeller member to cleanse, knead, massage and otherwise process the shrimp and like marine life therein to present fully cleansed substantially unmutilated meats. While the foregoing recites the preferred motion of the center plate and the segmented impeller member, an alternative cycle for these members would be a generally rectangular motion including movements straight upwardly, straight horizontally, straight downwardly, followed by horizontal return to the starting point.

In a preferred embodiment of the processing machine, the vertical stroke of the segmented impeller member and a center plate member is regulated so as to be in the range of 1 to 3 inches, and is preferably 2 inches. The horizontal stroke of the center plate is regulated so as to be in the range of 0.25 to 1.5 inches and is preferably 0.875 inch, while the horizontal stroke of the top impeller member is in the range of 0.50 to 2.0 inches and is preferably 1.125 inches. The cyclic motion of the center plate and the segmented impeller member is regulated so as to be completed within 1.125 to 4.5 seconds and preferably the cycles are completed in 2.25 seconds. It will be noted that the time required for the vertical stroke to reach its maximum point is approximately one-half the time required for the horizontal stroke to reach its maximum point since the horizontal stroke is approximately twice as long as the vertical stroke.

Referring now to FIGURE 2 wherein an alternative shrimp volume control device controlling the amount of shrimp passing between the receiving chute to the processing channel is illustrated. It will be noted, that generally like parts are referred to with like reference numerals. Thus, receiving chute 14 is provided with individual slots 14a, loosely mating with a feed appendage 19 of the center plate member 18, which is between a pair of processing rollers, however, only roll 17 is shown. In working relationship with the downwardly sloping surface of receiving chute 14 there is provided a roll gate 35 which extends the length of the receiving chute. Roll gate 35 is provided with an adjustable axis of rotation 37, such as by having a slot containing an aixs which may be adjusted to any position within the slot and fixed therein by suitable means, such as fastening nut 38. Substantially concentric with the roller 35 there is provided a ratchet means 36 which has an axis identical with the axis of the roller. In working relationship with the ratchet means 36 there is provided pawl means 39 and 39a for intermittently driving the roller in the direction indicated by the curved arrow. Pawl means 39 is pivotally attached to the lower extremity of interconnecting arm 28 and derives a limited horizontal movement, as indicated by the double-headed arrow from the moment of the lower end of the interconnecting arm 28 to intermittently or pulsatingly drive the roller 35. As the roller 35 is driven it will contact shrimp and the like on the upper ends of the receiving chute and allows a limited amount thereof to pass beneath it and to the processing channels. Preferably, roll means 35 is provided with an outer covering composed of a relatively soft frictional elastomeric material which does not materially damage the shrimp.

Referring now to FIGURE 3 wherein a diagrammatical end view of a processing machine 40 is shown. A suitably rigid frame 40a is provided to generally support and mount the various operational elements of the processing machine 40. Sloping shield or guide members 41 are provided to direct the marine life into the channels of the processing rollers 16 and 17. These processing rollers are suitably mounted for rotation and are driven toward each other as indicated by the curved arrows, by suitable power means (not shown). Positioned above and adjacent the cleaning channels of the respective processing rollers are water supply means, such as spray heads 42, which supply water to enhance the frictional properties of the shrimp and like marine life for cleansing and aid in washing trash downwardly. The trash from the shrimp and like marine life is pulled downward between the operating surface of the processing rollers 16 and 17 and the center plate member 18 to fall into a suitable trash container (not shown). As previously indicated, the processing rollers 16 and 17 are in generally horizontal plane, spaced apart a predetermined distance to form a channel. In the substantial center of the channel, and leaving some minor clearance between the peripheral surfaces of the rollers 16 and 17 and its body portion, a center plate member 18 is provided. The center plate 18 has a top portion 18a which generally tapers to form a wedge-like or knife-like top portion. In addition, the top working edge 18a of the center plate 18 also slopes from a high point 18b toward a low point 18c, thereby varying the amount of contact with the shrimp and the like in the processing channel. Attached to the center plate 18 and adjacent to the high point 18b there is a feed appendage 19 substantially similar to that previously discussed. The downward sloping surfaces of the processing rollers 16 and 17 and the top working edge 18a of the center plate 18 form a W-shaped channel along which the shrimp and like marine life are processed. Thus, in the machine shown at FIGURE 3, two such processing channel are illustrated, however, as hereinbefore indicated any number of channels may be provided as desired. It will be noted that the two outer processing rollers are supported by tensioned back-up members 44, which take the form of small diameter rollers or the like, urged against the non-operative side of the processing rollers to prevent any undue deflection along the length of the rollers. In larger forms of shrimp and like marine life, the outer covering may have a relatively substantial dimension and such outer covering must be dragged down and physically separated between the center plate 18 and the processing rollers 16 and 17, which may in certain instances cause deflection of the rollers at such working points. The two inner processing rollers are also provided with a back-up member 43 mounted in the non-operative channel formed therebetween. The back-up member 43 may be suitably rigid plate, and is preferably an aluminum plate in the general form of a T such that the arms thereof generally contact the entire surface of the processing rolls while the body portion thereof extends below the diameter of the processing roller to provide localized support along the length of the axis. It will be realized, of course, that other suitable support means may be provided between the various processing rollers. Mounted above the center plate 18 and in general registry therewith is the segmented impeller member 21. As shown, the segmented impeller member is provided with substantially uniform ridges 21b and grooves 21a, as best seen in FIGURE 5. Of course, the center plate 18 and the segmented impeller member 21 are substantially simultaneously driven through their respective vertically undulating and opposing cycles (which are generally perpendicular to the plane of the drawing) as explained hereinbefore to effect the cleansing of the raw shrimp.

As shown in FIGURE 4, a processing machine 50 has a sloping receiving chute 14 extending downwardly at an angle to a cross-machine plane to terminate generally in a plane parallel with the upper peripheral surface portion of processing rollers 16 and 17. The receiving chute 14 is provided with a plurality of uniformly spaced independent slots 14a which are in general alignment with the channels formed between the processing rollers. As will be seen, sloping shield or guide members 41 abut against the receiving chute 14 so as to form a substantially continuous surface therewith and thereby direct the marine life into the processing channels. The center plate 18 is provided with a knife-like edge 18a which in cooperation with the various other working components, controllably slits the shrimp and life to expose the veins for subsequent removal from the shrimp. Attached to the receiving end 11 of the center plate 18 there is a feed appendage 19 which is in loose mating relationship with the individual slots 14a. Thus, when raw shrimp and the like are placed on the receiving chute 14 and are allowed to pass beyond the pulsating gate (not shown in this figure) the marine life contacts the feed appendage 18 which lifts and propels the marine life forwardly toward the discharge end of the machine in response to the unique vertically undulating cycle which the center plate and feed appendage is driven through. It will be noted that with the feed appendage in place, a substantially continuous surface is formed whereby the shrimp cannot fall through or otherwise escape and must pass down the processing channel. As will be realized, the segmented impeller member is not shown in this figure as it would tend to obscure the relationship of the components herein shown. Nevertheless, a segmented impeller member is provided in spaced working relationship above the center plate 18 for massaging and kneading the shrimp in the processing channel and to insure that no shrimp and like marine life pass throughout the channel without contacting the processing rolls and center plate, such as by riding on top of other marine life within the channel. The segmented impeller member continuously moves the shrimp and like marine life within the channel to insure that a continual change of position of the marine life is taking place within the processing channel to insure that all portions and members thereof are exposed to the cleansing operations.

Referring now to FIGURE 5 wherein a partial detailed view of the segmented impeller member 21 is illustrated. The main body of the segmented impeller 21 is composed of or covered with a resilient flexible material, preferably having a rigid axis portion, such as a relatively small dimensioned steel rod. The outer covering material may be a plasticized plastic, rubber, or any other similarly appropriate synthetic elastomer. It will be noted that the main body portion is generally in the shape of a cylindrical rod which preferably has an outside diameter in the range of 0.125 to 1.0 inch. Uniformly spaced along this main body portion of the segmented impeller there is provided substantially uniform ridges 21b which thereby define substantially uniform grooves 21a extending along the length of the impeller member 21. The ridges 21b are preferably formed of a similar elastomeric material as the outer covering of the main body portion and are generally of a height 47 substantially in the range of 0.5 to 0.03 inch and have a width 46 substantially in the range of 0.25 to 0.05 inch. The ridges 21b may be preformed on a cylindrical rod or they may be manufactured independently and then placed over the smooth surfaced rod and suitably fastened thereto, as by glue, so as to form the segmented impeller member 21. Thus, it will be noted that the ridges provide substantially flexible contact points for the shrimp and like marine life within the processing channels to knead, thrust and otherwise work the shrimp therein in cooperation with the other members of the machine to fully cleanse and de-vein the shrimp and like marine life without mutilating the meats thereof. Preferably, the ridges 21b are spaced apart a distance 48, which is the groove axial dimension, that is in the range of 2.0 to 3.0 inches, thereby presenting a discontinuous solid surface which contacts the shrimp and like marine life in the processing channel at various pressure points and exerts various force components thereon to controllably slit and forwardly thrust the shrimp toward the discharge end of the machine.

In summary, it will be seen that there is provided an improved shrimp and like marine life processing method and machine which is capable, because of its unique features, of removing the outer shell, various attached appendages, veins, entrails, sand, grit, etc. in a single pass so as to present fully cleansed substantially unmutilated meats. The processing machine embodies unique cooperation between the various operating components thereof to achieve this result in a relatively inexpensive manner. The processing machine is provided with operating components having waterproof, non-toxic, frictional operating surfaces, some of which have localized yieldable areas. The processing method and machine of the invention provides unique cooperation of the various operative elements to yield fully cleansed, ready to eat meats and yet the machine is easy to operate and maintain and is economical to manufacture.

It will be understood that modifications and variations may be effected without departing from the spirit and scope of the novel concepts of the present invention.

We claim as our invention:

1. A machine for cleaning shrimp and like marine life comprising at least a pair of generally parallel roller members mounted for rotation and having inwardly and downwardly sloping frictional surfaces defining a channel therebetween, a first drive means rotating said roller members toward each other, a vertically movable center plate positioned in said channel having side surfaces facing said sloping surfaces, a segmented impeller member in spaced working relationship above the center plate and movable therewith, and a second drive means moving the center plate through a vertically undulating cycle relative to the roller members while substantially simultaneously moving the segmented impeller member through a substantially opposing vertically undulating cycle relative to the center plate cycle.

2. A machine according to claim 1 wherein the segmented impeller member is provided with a discontinuous solid surface for working on the shrimp.

3. A machine according to claim 2 wherein the discontinuous solid surface is composed of a frictional non-toxic solid elastomer.

4. A machine according to claim 2 wherein the segmented impeller member is provided with a plurality of substantially uniformly spaced rectangular grooves and ridges, said grooves having an axial dimension in the range of 2.0 to 3.0 inches and extending radially inwardly along substantially parallel side walls at least 0.1 inch, said ridges having an axial dimension in the range of 0.25 to 0.05 inch thereby presenting working edges to the shrimp and the like.

5. A machine for cleaning shrimp and the like comprising, a receiving chute for receiving raw shrimp and the like, said chute having a plurality of spaced individual slots therein, at least a pair of relatively rotatable processing rollers having receiving ends in abutting relationship to said receiver chute and discharge ends extending therefrom, said rollers being spaced apart a distance to form a channel therebetween, power means for rotating said roller relative to one another, a vertically movable upwardly extending planar member substantially coextensive with the rollers from the receiving ends to the discharge ends thereof positioned in the substantial center of said channel, said upwardly extending planar member having a feed appendage attached at its receiving end, said feed appendage loosely mating with a slot in said receiver chute preventing escape of marine life therethrough, a segmented impeller member in spaced working relationship above said upwardly extending planar member and being movable therewith, and a drive means moving the upwardly extending planar member through a triangular-like cycle, first upwardly and forwardly, next downwardly and forwardly and then horizontally backwardly while substantially simultaneously moving the segmented impeller member first upwardly and backwardly, next downwardly and backwardly and then horizontally forwardly whereby the feed appendage moves within the slot of the receiving chute transporting raw shrimp and the like from said receiving chute to the channel whereat the co-action of the processing rollers, the upwardly extending planar member and the segmented impeller member while being driven through their respective movements peels, de-veins, and otherwise cleans the shrimp and the like to produce fully cleansed meats.

6. A machine as defined in claim 5 including a movable pulsating gate in working relationship with the receiving chute to control the volume of raw shrimp and the like passing to the channel, said gate pulsating in response to the movement of the feed appendage.

7. A machine as defined in claim 6 wherein the pulsating gate is moved by the drive means moving the upwardly extending planar member and the segmented impeller.

8. A machine as defined in claim 6 wherein the pulsating gate has a rectangular-like planar body extending substantially coextensively with the receiver chute, said body having an upper and lower end, said upper end being pivoted about a point remote from the receiving chute, said lower end being arcuately movable toward and away from the receiving chute thereby allowing raw shrimp and the like to pass by the lower portion of the gate in response to the arcuate movement thereof.

9. A machine as defined in claim 6 wherein the pulsating gate is a roller substantially coextensive with the receiver chute and having an adjustable axis of rotation, said roller having a ratchet means concentric with said roller and a pawl means in working relationship with said ratchet means whereby said pawl means pulsates in response to the movement of the feed appendage to intermittently rotate the roller thereby controlling the volume of raw shrimp and the like passing to the channel.

10. A machine as defined in claim 9 wherein the roller has an outer covering composed of relatively soft frictional elastomeric material.

11. A machine for cleaning shrimp and the like comprising a receiving chute for receiving raw shrimp and the like, said chute having a plurality of spaced individual slots extending downwardly from a point thereon, a pulsating gate member having a lower portion thereof arcuately movable toward and away from said receiving chute, said lower portion of the pulsating gate being adjacent the aforesaid point, a plurality of V-shaped shield members abutting portions of said receiver chute and extending away therefrom at least a pair of relatively rotatable processing rollers having receiving ends in working relationship with said receiver chute and discharge ends extending away therefrom, said processing rollers being spaced apart a distance to define a channel therebetween, said channel being in a general alignment with an individual slot in said receiving chute, a power means for rotating said processing rollers relative to one another, a vertically movable upwardly extending planar member substantially coextensive with said processing rollers from the receiving ends to the discharge ends thereof, said upwardly extending planar member having a tapered working edge sloping downwardly from the receiving end toward the discharge end thereof and having a feed appendage attached to the receiving end thereof in mating relationship with an individual slot in said receiving chute to contact raw shrimp and the like thereon and prevent escape therethrough, a segmented impeller member in working relationship above said upwardly extending planar member and being movable therewith, and a drive means cyclically moving said upwardly extending member through an inverted D-shaped path while substantially simultaneously moving said segmented impeller member through a substantially opposing cycle so that the shrimp in the channel are propelled forwardly and moving the pulsating gate to control volume of raw shrimp flow from the receiver chute to the channel.

12. A machine as defined in claim 11 including a plurality of water supply means positioned adjacent the segmented impeller member for supplying water to the surfaces of the segmented impeller, the processing rollers and the upwardly extending planar member thereby lubricating and washing the same.

13. A machine as defined in claim 11 wherein the tapered working edge of the upwardly extending member cooperates with the segmented impeller member to controllably slit the shrimp and the like in the channel to expose veins for removal and propel the shrimp and the like in a forward direction.

14. In a machine for cleaning shrimp and the like, the combination comprising, a downwardly sloping chute means, said chute means having spaced slot means at the lower end thereof, a vertically moving feed means in loose mating relationship with said slot means, and a movable pulsating gate means spaced above said slot means and in working relationship with said chute means; whereby shrimp and the like travel down the chute means up to the gate means to be controllably passed thereunder to contact the feed means to be propelled through the cleansing machine.

15. The combination as defined in claim 14 wherein the pulsating gate means are moved in response to the movement of the feed means.

References Cited
UNITED STATES PATENTS

| | | | |
|---|---|---|---|
| 2,537,355 | 1/1951 | Lapeyre et al. | 17—2 |
| 2,778,055 | 1/1957 | Lapeyre et al. | 17—2 |
| 2,832,092 | 4/1958 | Lapeyre et al. | 17—2 |
| 2,886,644 | 5/1959 | Lapeyre et al. | 17—2 |
| 2,976,564 | 3/1961 | Skrmetta | 17—2 |
| 2,988,771 | 6/1961 | Lapeyre et al. | 17—2 |
| 3,018,510 | 1/1961 | Lapeyre et al. | 17—2 |
| 3,070,832 | 1/1963 | Lapeyre et al. | 17—2 |
| 3,070,833 | 1/1963 | Skrmetta | 17—45 |
| 3,080,605 | 3/1963 | Welcker et al. | 17—2 |
| 3,143,761 | 8/1964 | Welcker et al. | 17—2 |
| 3,143,763 | 8/1964 | Welcker et al. | 17—45 |
| 3,203,034 | 8/1965 | Matzer et al. | 17—2 |

LUCIE H. LAUNDENSLAGER, *Primary Examiner.*